June 30, 1942. F. H. SPEED ET AL 2,288,494
CHAIN WELDING
Filed Aug. 1, 1941 10 Sheets—Sheet 2
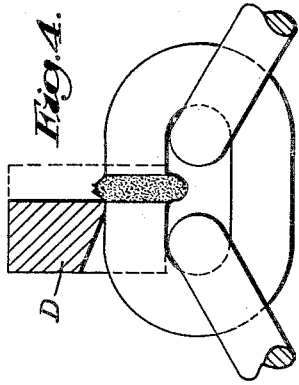
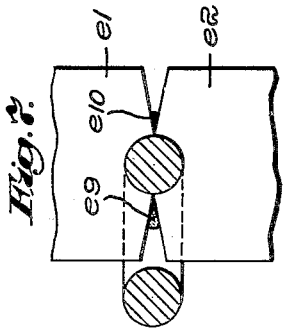
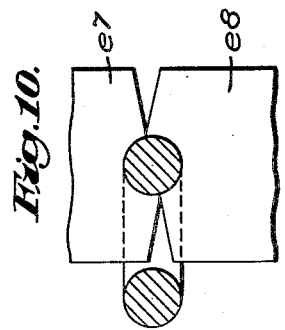
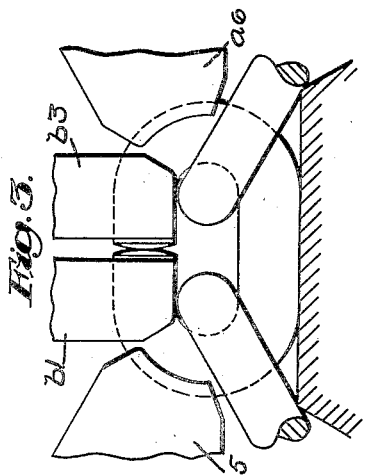
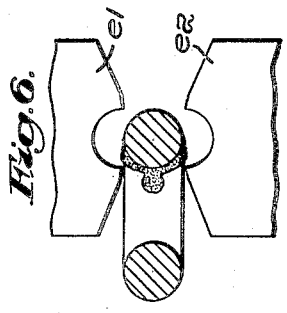
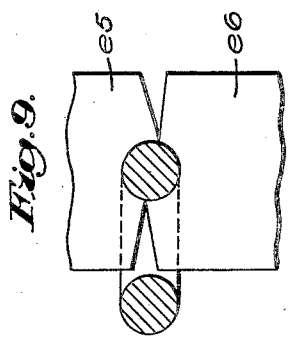
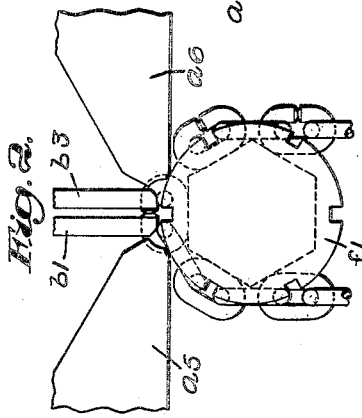
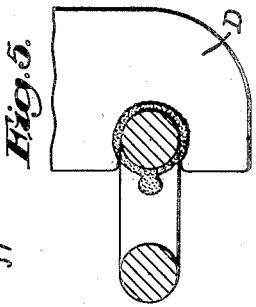
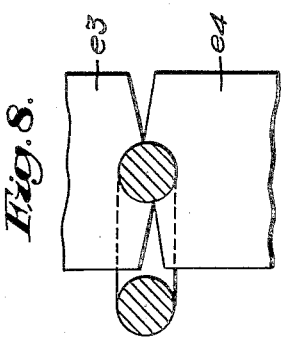
Inventors:
Francis H. Speed,
John S. Pike,
by Rowland V. Patrick
Attorney

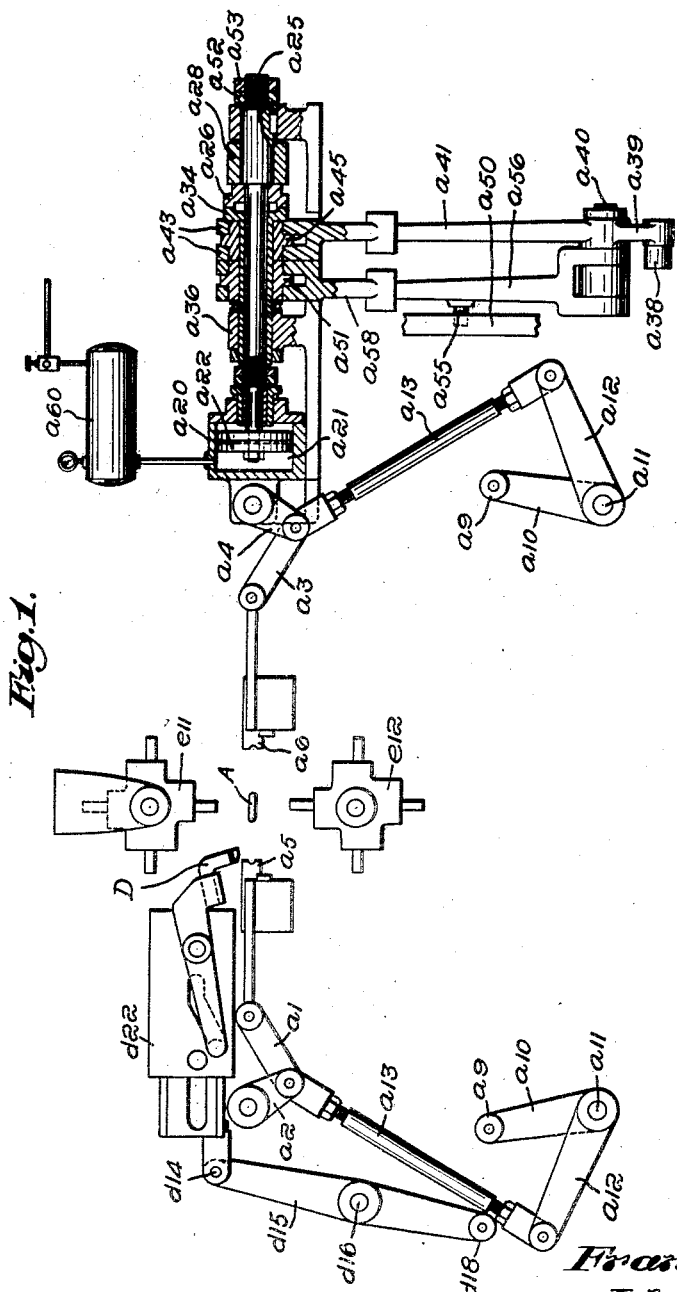

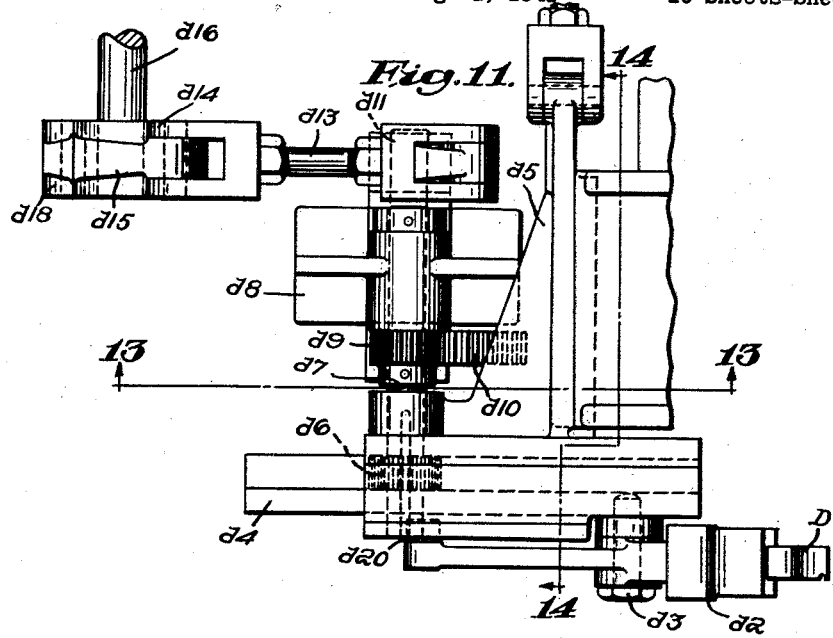
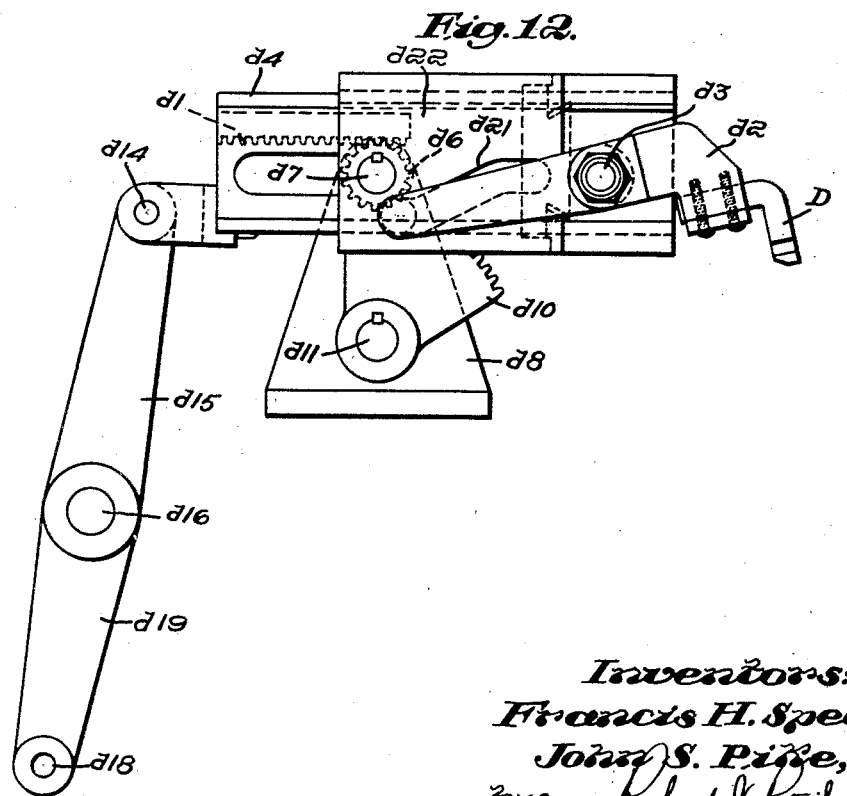

June 30, 1942.  F. H. SPEED ET AL  2,288,494
CHAIN WELDING
Filed Aug. 1, 1941  10 Sheets-Sheet 4
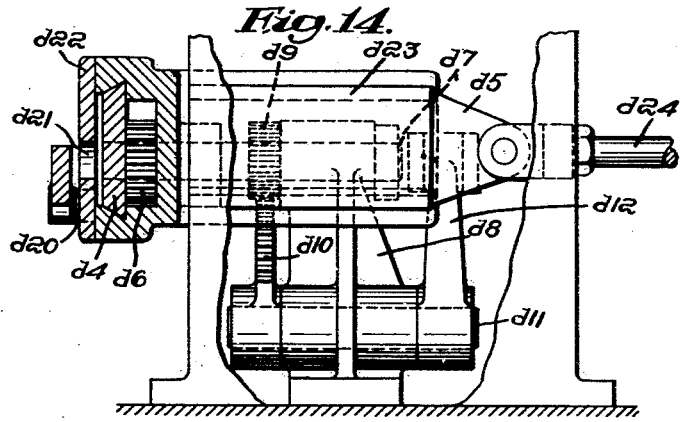
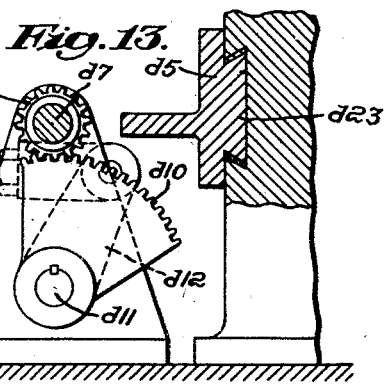
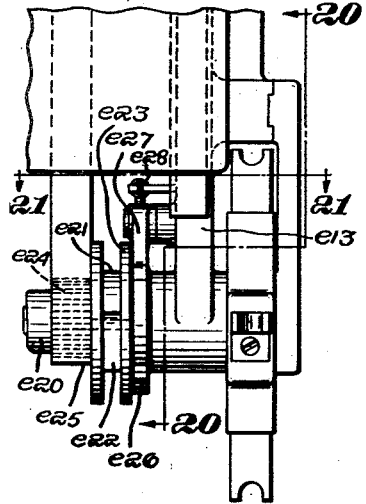
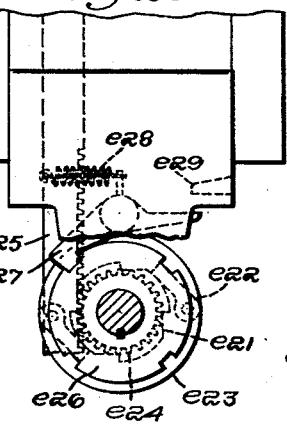
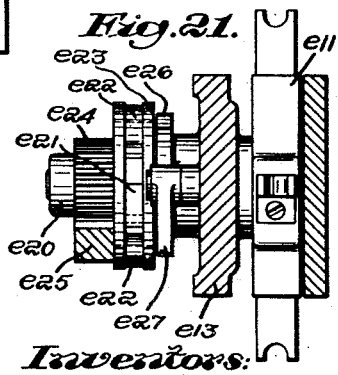
Inventors:
Francis H. Speed,
John S. Pike,
by Rowland V. Patrick
Attorney

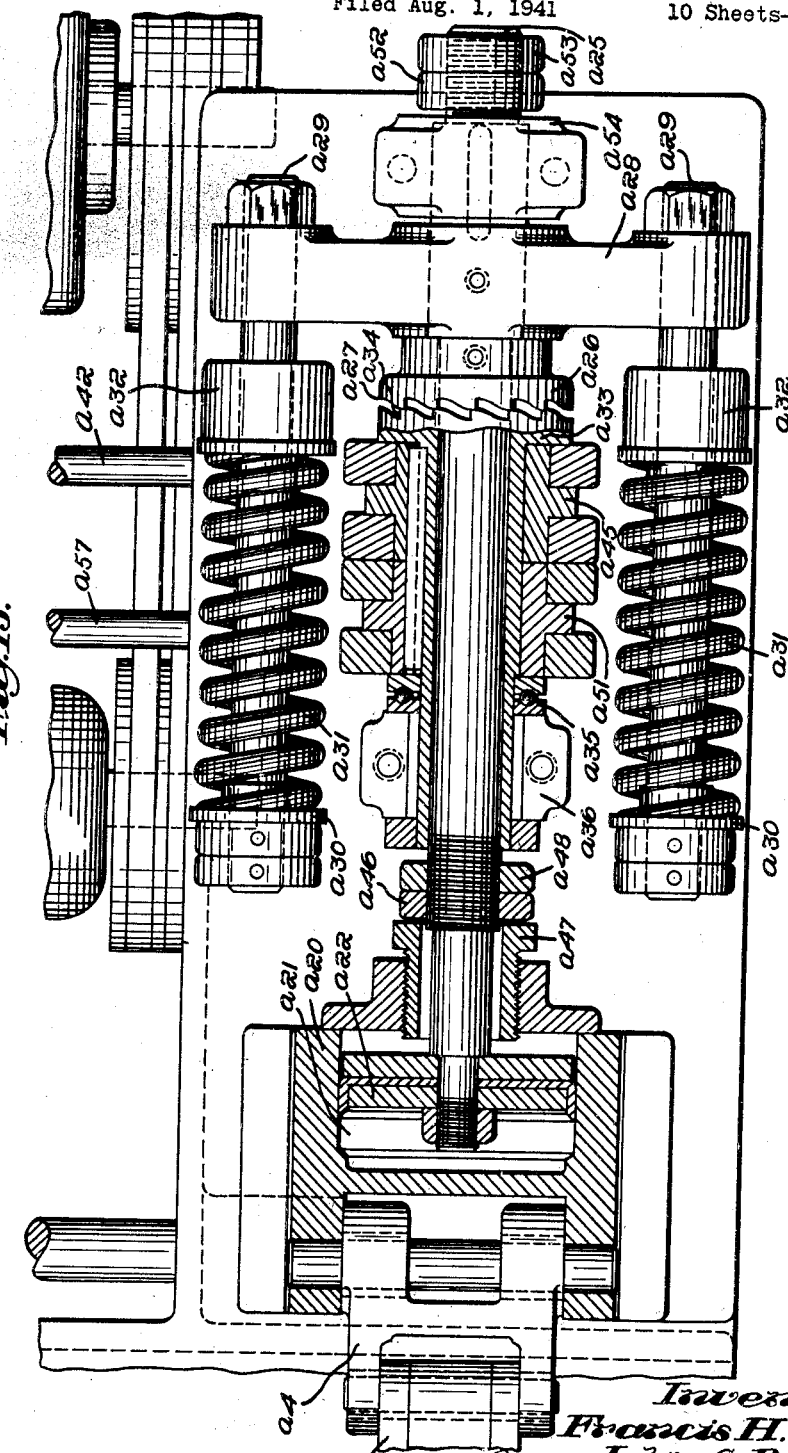

June 30, 1942.  F. H. SPEED ET AL  2,288,494
CHAIN WELDING
Filed Aug. 1, 1941  10 Sheets-Sheet 6
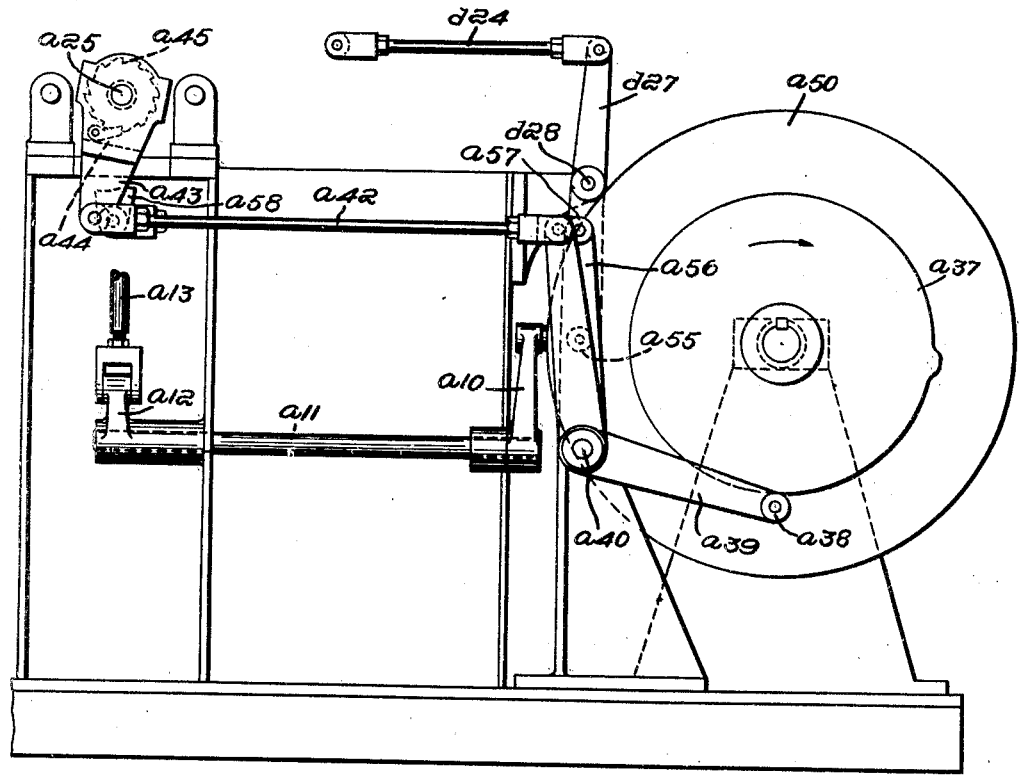
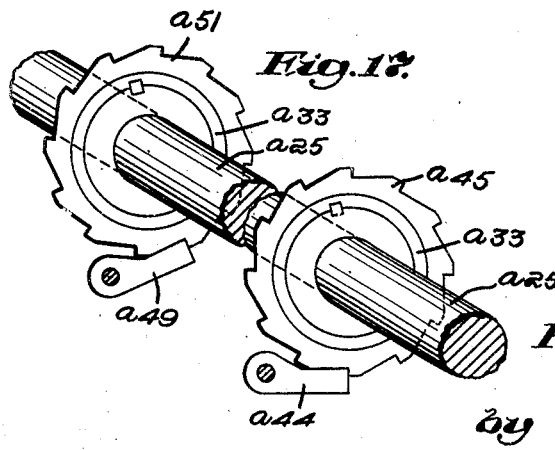
Inventors:
Francis H. Speed,
John S. Pike,
by Rowland V. Patrick
Attorney June 30, 1942.   F. H. SPEED ET AL   2,288,494
CHAIN WELDING
Filed Aug. 1, 1941   10 Sheets-Sheet 7

Inventors:
Francis H. Speed,
John S. Pike,
by Rowland V. Patrick
Attorney

June 30, 1942.　　F. H. SPEED ET AL　　2,288,494

CHAIN WELDING

Filed Aug. 1, 1941　　10 Sheets-Sheet 8

Inventors:
Francis H. Speed,
John S. Pike,
Rowland V. Patuck
by
Attorney

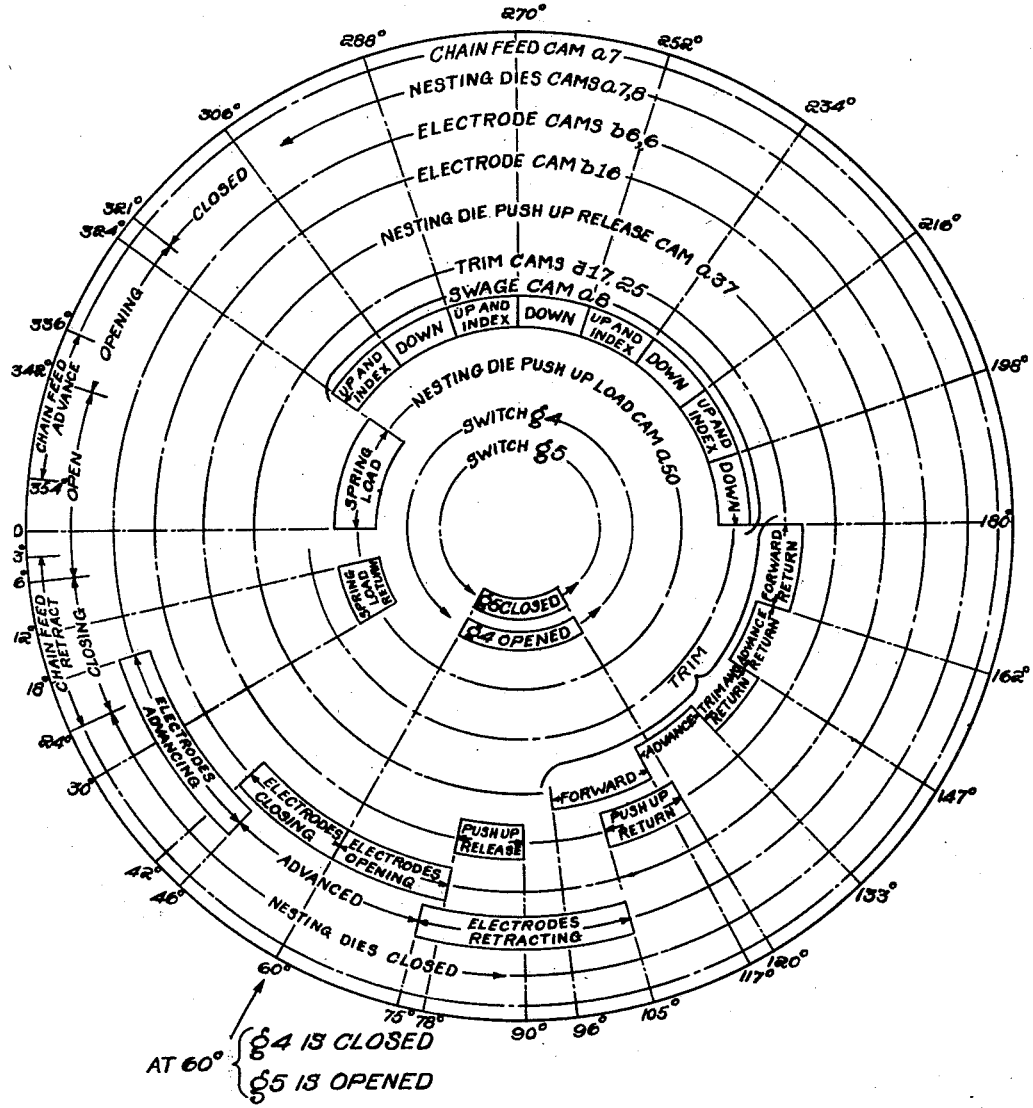

June 30, 1942.  F. H. SPEED ET AL  2,288,494
CHAIN WELDING
Filed Aug. 1, 1941    10 Sheets-Sheet 10
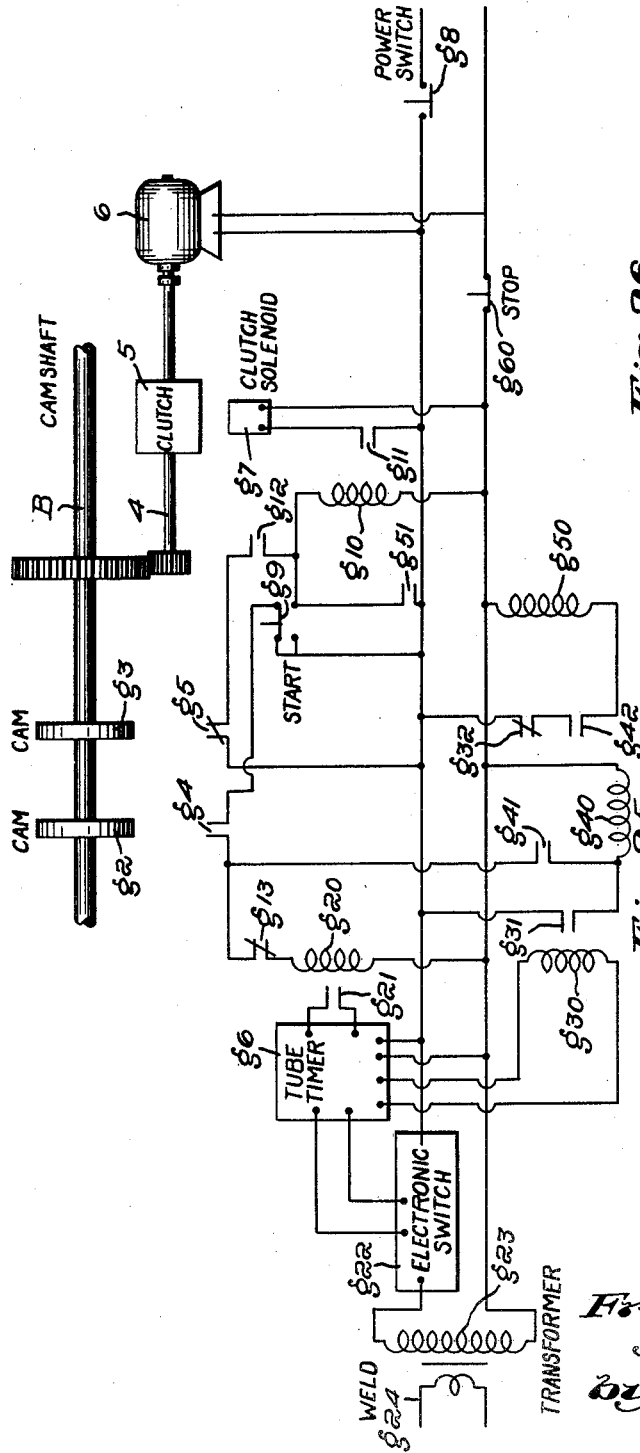
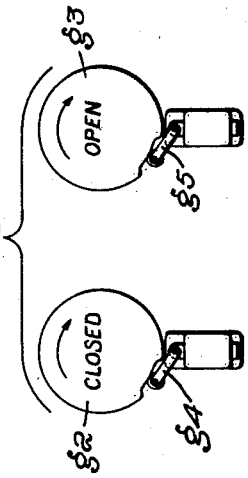
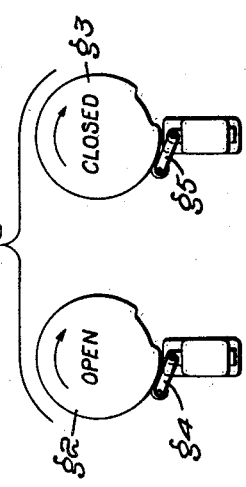
Inventors:
Francis H. Speed,
John S. Pike,
by Rowland & Patrick
Attorney Patented June 30, 1942

2,288,494

UNITED STATES PATENT OFFICE 2,288,494

CHAIN WELDING

Francis H. Speed, Lynnfield, and John S. Pike, Lynn, Mass., assignors to Thomson-Gibb Electric Welding Company, Lynn, Mass., a corporation of Massachusetts Application August 1, 1941, Serial No. 405,056

19 Claims. (Cl. 219—5)

This invention relates to electric chain welding and more particularly to an apparatus and a method for automatically electrically welding the open ends of the links in the manufacture of load chains.

The main object of the invention is an apparatus and method by which the links of a load chain are electrically welded automatically so that all the operator need do is to place a chain in the machine, start it, stop it when the alternate links have been welded and remove the chain from the machine. To complete the chain, it is run through the machine again to weld the alternate links which were not welded in the first run.

Another object of our invention is an apparatus and method by which the welds of the chain links are made stronger and more uniform than heretofore.

A general requirement for classification as a commercial load chain is a chain which has the strength to withstand heavy intermittent loads and in which the welds of the links are at least equal in strength to the strength of the remainder of the links. Usually the links of such chains are formed of steel wire of diameters in the range from about $\frac{3}{32}''$ to $\frac{9}{16}''$.

While many attempts have been made to design and construct a completely automatic load chain welder, these attempts, so far as we are aware, have been unsuccessful because of the lack of uniformity in the welds of the links whereby some of the link welds at least have less strength than is necessary in a commercial load chain.

The difficulty has been that it has heretofore been necessary to form the chain welds with a very substantial amount of burr in order that the metal of the burr may retain its heat during the swaging of the weld so that the swaging may be properly performed to produce as good a weld as was possible. To produce this large burr it was necessary to heat the metal of the link a considerable distance back from the contacting ends of the link, that is, there was a spread of the heat for a substantial distance back of the link ends. To accomplish this the electrodes gripped the link a considerable distance back from its ends so that the ends of the link extended beyond the electrodes a distance more than one-half the diameter of the link. Also it was necessary to maintain the electric welding current for a length of time sufficient to heat the relatively large amount of metal necessary to make the weld. The ends of the link were most highly heated and therefore most plastic. The plasticity of the metal decreased from the ends into the link to points where the metal was not plastic at all. These points, one in each link, provided hard metal between which the plastic metal was compressed by the push-up and was in part extruded into the burr. Because of the large heat spread and the unavoidable variation in the links themselves these points varied to such a degree that an invariable automatic push-up was not possible. A variability in the push-up was therefore required. Hence the amount of the push-up had to be under the manual control of the operator. It has therefore been the practice for many years in the electric welding of load chains for the operator to control the character of the push-up. This required highly skilled operators who, only after a long practice, were able to secure just the right push-up, which might vary with different links, that was necessary to make the best weld possible.

One of the features of our invention is that we reduce the variations in the heated metal to a minimum so that an automatic invariable push-up will produce commercially uniform welds of maximum strength. To this end we confine the heat spread close to the abutting ends of the link so that the hard metal back of the soft metal is likewise close to those ends. We cause our electrodes to clamp the links close to the abutting ends and limit the duration of the welding current flow so as not to overheat the metal to be welded and confine the plastic metal to the abutting ends of the link between the pairs of electrodes. The distance of the push-up is small and the extruded burr is small. We do not swage this small annular burr because practice has shown that swaging a small annular burr cools quickly the metal in its periphery and makes it hard and brittle and when the link is swaged some of this hard brittle or dross metal, particularly at the top and bottom of the weld, is squeezed into the link thereby reducing the amount of good metal in the weld and weakening it. This is the defect known as "necking."

We have found that this difficulty is overcome by trimming off the top, outside and bottom of the burr before swaging.

This leaves only a very small amount of metal, almost all on the inside of the link, to be swaged. Most of this metal is broken off in the swaging and what is left is so small in amount that little or no dross metal is squeezed into the weld and the defect of necking is entirely eliminated or rendered negligible.

In the former practice the necessity for a considerable push-up, required to produce a large burr, involved in many instances severe strains in the portion of the link diametrically opposite the weld. These strains resulted in distortion of the link and in high stresses in the metal which caused weak links. By our invention the push-up is small and therefore the distortion of the link and the stresses in the metal are reduced to a minimum.

Again in the hand operated push-up, heretofore used in welding load chains, the rigidity of the link prevented sufficient push-up to work all the metal heated by the large heat spread. A pressure, which was high enough to work all the metal in the large heat spread, would not be practicable because such pressure would cause so great a push-up as to distort the welded link objectionably. It is a known fact that the heating of metal to a welding temperature results in an open grain and, unless it is subsequently worked by pressure, the grain remains open and the metal weakened. Thus it has been found that in load chains heretofore welded the metal adjacent each side of the weld is apt to be the weakest metal in the link due to its open grain character of unworked, but heated, metal.

By confining the heat spread in a narrow band, we are able to apply sufficient pressure in a relatively small push-up to work and refine all the metal in the band of which the grain has been opened by the heat, so that it is made close grained and stronger. Links welded in accordance with our process therefore are free from distortion and have a close grain throughout and undiminished strength.

In the use of our machine the following operations constitute a cycle, taking as the end of the cycle the bringing of an unwelded link into welding position. The nesting dies move towards one another to press against the outer ends of the link and to press the ends of the link to be welded together with a critical predetermined pressure varying with gauge and type of link and material. The pairs of electrodes move forward and grip the top and bottom of the link close to its abutting ends. The welding current is turned on and flows for a predetermined length of time to raise the abutting ends of the link to welding temperature. The electrodes are disengaged from the link. One of the nesting dies is moved to press the ends of the link together a predetermined distance thereby forming the weld and a small burr around the weld. The electrodes are drawn back. A cutter is brought into position and is operated to trim off the burr on the outside, top and bottom of the weld. Swaging dies operate to form a fin or fins from the remainder of the burr and to break off those fins and swage the metal and improve its grain. The nesting dies are withdrawn from the outer ends of the link. The sheave, on which the chain is mounted, is rotated to remove the welded link and bring the next link to be welded into welding position. This completes the cycle of operation in welding the link.

Fig. 1 shows schematically in elevation a link in welding position, nesting dies which press against the outer ends of the link, the burr cutter and the swaging dies, omitting the chain carrying sheave.

Fig. 2 shows in plan the sheave on which the chain is mounted, which is not shown in Fig. 1.

Fig. 3 shows in plan a link held by the nesting dies with the ends to be welded pressed against one another and also the ends of the upper electrodes.

Fig. 4 shows in plan the link with the burr around the weld and the burr cutter brought into alignment with the burr and about to trim off the burr.

Fig. 5 is a cross-section in elevation of the link and the burr and shows the cutter operating to cut off the portions of the burr on the outside, the top and the bottom of the weld.

Fig. 6 shows a sectional end elevation of the link and what remains of the burr after the operation of the cutter and also a pair of swaging dies about to be brought against the link.

Fig. 7 shows the pair of swaging dies at the ends of their stroke and the fins of metal which have been pushed out by their swaging operation.

Figs. 8, 9 and 10 show pairs of dies with legs of unequal length which cut off the fins of the burr.

Figs. 11 to 14 show the mechanism for operating the burr cutter, Fig. 11 being a plan thereof; Fig. 12 being a front elevation; Fig. 13 being a sectional view taken along the line 13—13 of Fig. 11; and Fig. 14 being a section along the line 14—14 of Fig. 11 with part of the frame broken away.

Fig. 15 shows in plan, partly in section, the mechanism which causes the push-up of the ends of the link with its resultant burr, as shown in Fig. 4.

Fig. 16 is an end elevation of certain parts of the machine some of which operate the mechanism of Fig. 15.

Fig. 17 is a detail of the shaft and ratchets shown in Fig. 16.

Figure 18:
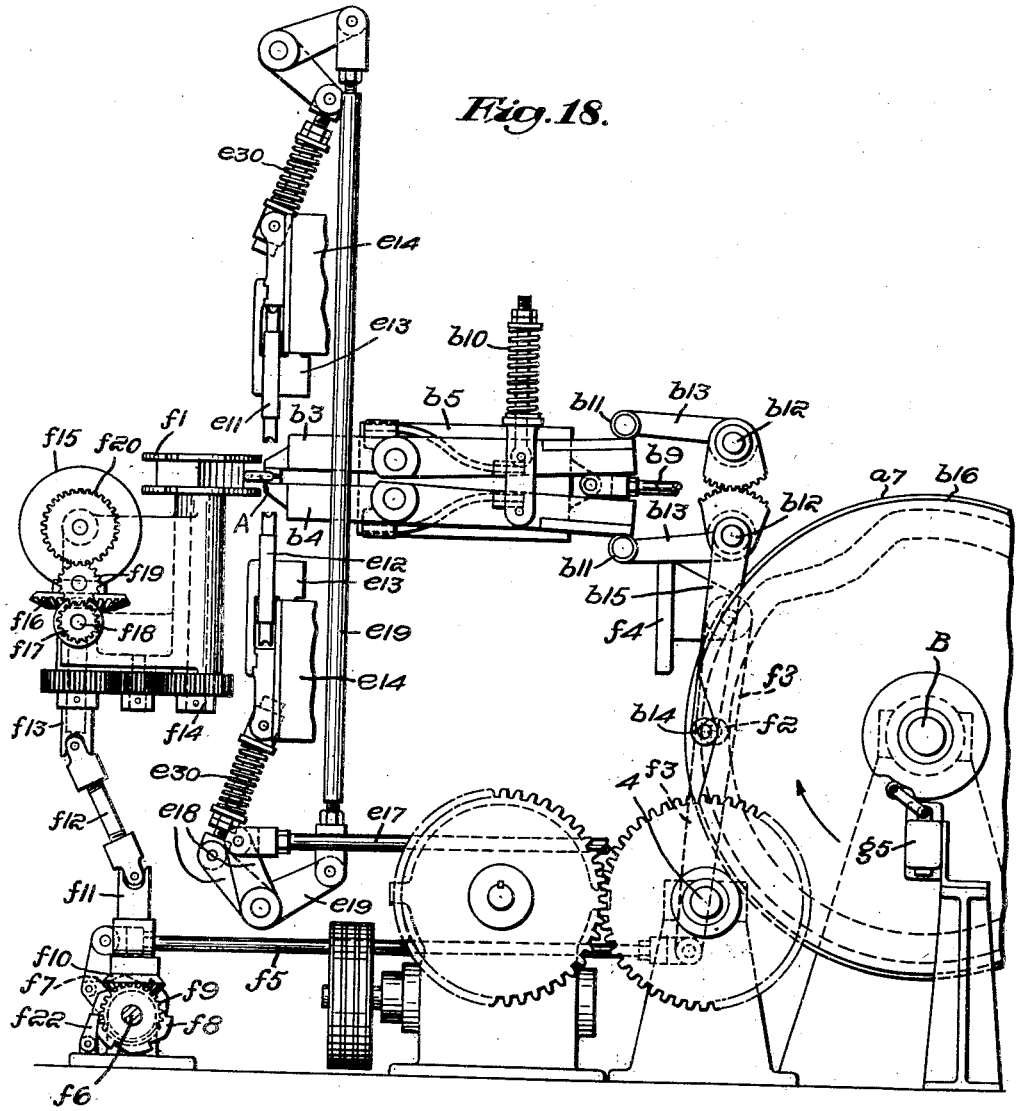

Fig. 18 is a side elevation of the electrodes and their operating mechanism, of the swaging dies and their operating mechanism and of the chain carrying sheave and its operating mechanism with the parts in welding position at 60° in the cycle.

Fig. 19 is an end elevation of the upper swaging dies.

Fig. 20 is a detail of the mechanism for rotating a swaging die turret, taken on line 20—20 of Fig. 19.

Fig. 21 is a horizontal cross-section taken on the line 21—21 of Fig. 19.

Figure 22:
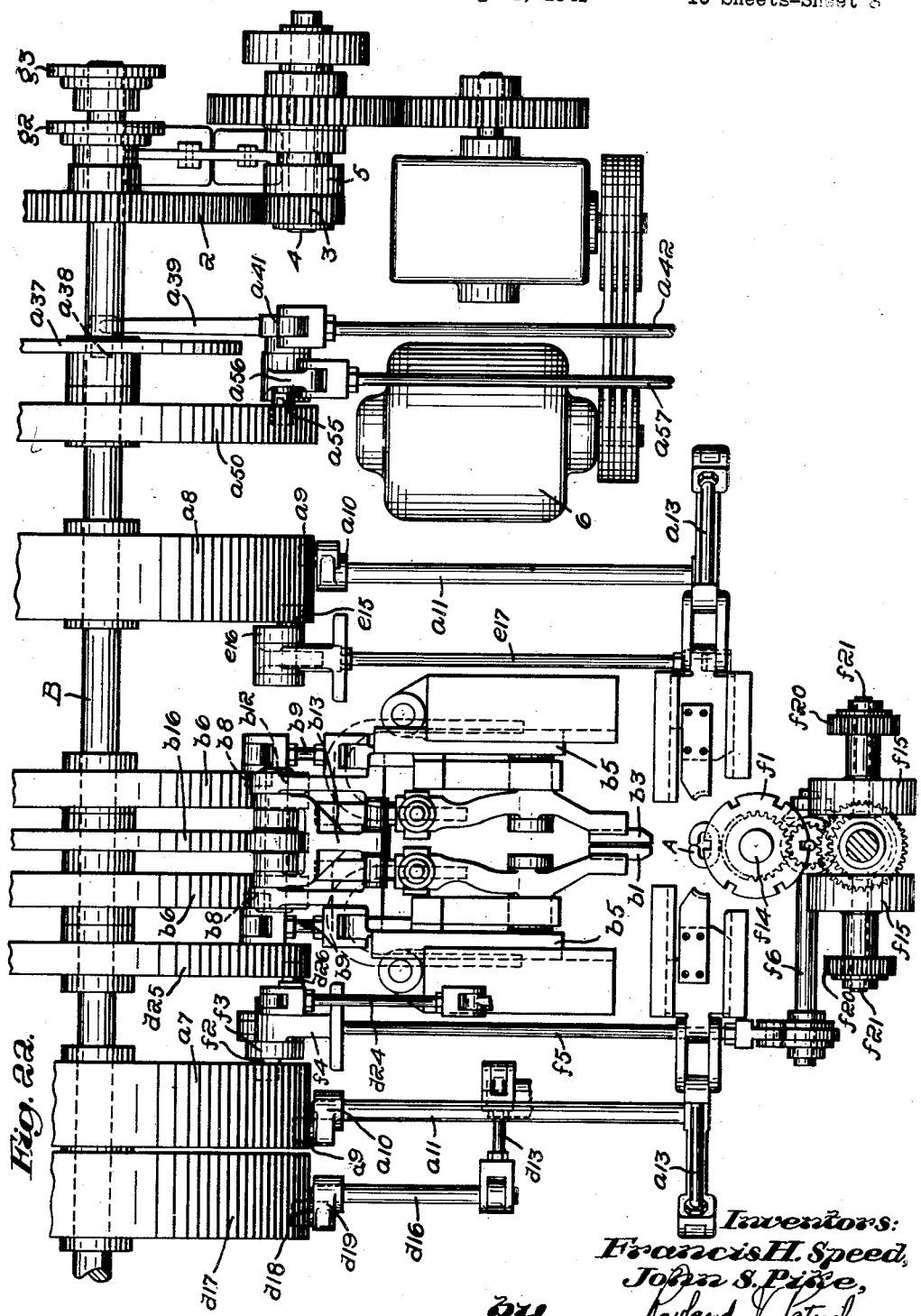

Fig. 22 is a plan view of the operating mechanism of the machine including the main cam shaft at the beginning of the cycle.

Fig. 23 is a diagram illustrating the sequential operations of the mechanism in one cycle of the machine.

Fig. 24 is a diagram of the electrical devices and circuits.

Fig. 25 diagrammatically illustrates switch control cams at 0° in the cycle.

Fig. 26 diagrammatically illustrates the same cams at 60° in the cycle.

A cycle in the operation of the machine will first be described, assuming that the parts are, as shown in Fig. 1, with an unwelded link A in welding position.

The toggles $a1$, $a2$ and $a3$, $a4$, Fig. 1 are straightened to force the nesting dies $a5$ and $a6$ against the outer ends of the link A to press the ends to be welded against one another, as shown in Fig. 3. The left-hand die $a5$ is pressed unyieldingly, but the right-hand die *a6* is pressed with yielding pressure as will be described.

The pairs of electrodes, of which the ends of the upper members *b1*, *b3* are shown in Fig. 3, are advanced and clamped upon the tops and bottoms of the ends of the link preferably closely adjacent to the abutted ends of the link. The distance from an electrode to the end of the link gripped by it is preferably 10 to 30% the diameter of the link, the optimum being about 20%. This limits the heat and the plastic metal to a small volume at the end of each link and provides cold hard metal close to the ends of the link, in effect in line with the sides of the electrodes next to the abutting ends.

The welding current is turned on by a switch operated from the main cam shaft B, Fig. 22, which switch initiates the operation of a tube timer which controls the duration of the current flow. This tube timer may be either a "definite time" timer or a "compensating time" timer, the latter controlling the duration of the welding current by the heat units imparted to each weld. The flow of the current across the ends to be welded softens the metal of those ends between the pairs of electrodes. Because of the small volume of metal at the ends of the link to be heated the duration of the current flow may be materially less than in the prior practice in which the electrodes clamped the link at a greater distance from its ends. For example, with a link one-half an inch in diameter, the current need flow no more than 2 seconds, and usually less, compared with 7 or 8 seconds in the prior practice.

Preferably after the current has ceased, the right-hand nesting die *a6*, Fig. 3, is pressed strongly a short distance to the left to press the ends of the link together to form the weld and create the burr, Fig. 4. This is the "pushup."

The electrodes are disengaged from the link preferably before the push-up and begin to retract just before the push-up starts.

The cutter D is now operated to cut off a very substantial amount of the burr. The cutter, Fig. 5, has an open semi-circular notch near its end, the sides of which are adapted to engage and fit closely about approximately the semi-circumference of the link with cutting edges extending to the edge of the cutter.

The cutter D is shown in Fig. 1 in inoperative position where it is out of the path of movement of the electrodes. To bring the cutter to cutting position as shown in Fig. 4, it is moved to the right, downward and then forward. From its position in Fig. 4 it is moved again to the right to cut off the burr. To restore it to inoperative position, Fig. 1, its movements are reversed.

The removal of the burr on the top, bottom and outside of the link leaves substantially only the metal on the inside of the link between the top and bottom as shown in Fig. 6.

The subsequent operation of the swaging dies, *e1*, *e2*, *e3*, *e4*, *e5*, *e6*, *e7* and *e8*, removes practically all of this portion of the burr. Figs. 6 and 7 show the operation of the first pair of swaging dies *e1*, *e2*, by which the burr on the inside of the link, shown in Fig. 6, is pressed and extruded in a fin *e9* on the inside of the link. A very small fin *e10* is extruded on the outside of the link which fin is formed of the metal left on or near the outside of the link because the cutter D must have some tolerance in its fit on that part of the link.

Figs. 8, 9 and 10 show the operation of the other pairs of swaging dies *e3*, *e4*, and *e5*, *e6* and *e7*, *e8*, respectively, by which the burrs are broken off and removed.

The swaging dies are mounted in two turrets *e11* and *e12* shown in Fig. 1. The turrets are intermittently rotated in the blocks in which they are carried and the blocks are suitably reciprocated toward and from each other by mechanism to be described.

The swaging, following the cutting, leaves only a very small amount, in fact a negligible amount, of the burr which is pressed into the soft metal of the weld.

The swaging operation completes the formation of the weld.

The result is a weld that is free from objectionable "necking," from distortion and from open grain metal. It is therefore stronger than the welds heretofore made on machines which have been used for electrically welding the links of load chains.

Thereafter the nesting dies *a5* and *a6* are withdrawn by the breaking of the toggles *a1*, *a2* and *a3*, *a4* and the push-up mechanism is restored to its retracted position shown in Fig. 1.

The chain carrying sheave *f1* is rotated one step to remove the welded link and to bring the next unwelded link, lying in the same plane, into welding position.

This completes the cycle of the machine.

The mechanism by which the devices above described are actuated will now be described in the order in which they operate in the cycle of the machine.

The nesting dies, Fig. 1, are closed upon the link as follows. The cam shaft B is provided with two cams *a7* and *a8*, Fig. 22, each of which has a cam groove into which projects a roller *a9* on the end of an arm *a10* on shaft *a11*. The cams begin to rock the shafts *a11* shortly (about 6°, Fig. 23) after what may be called 0° position of the cam shaft, after the link A has been brought to welding position as shown in Fig. 1. The rocking of the shafts *a11* lifts the arms *a12* and the links *a13* to straighten the toggles and to press the nesting dies against the outer ends of the link as shown in Figs. 2 and 3. The left-hand die *a5* is positively actuated. The right-hand die *a6* is yieldingly actuated. The straightening of the toggle *a3*, *a4* tends to move the housing *a20* to the right. This housing contains a chamber *a21* in which there is a piston *a22* secured to the end of rod *a25*, which at this time is stationary. The movement of the housing *a20* is cushioned by the air under pressure in the chamber *a21* so that the pressure of the die *a6* on the outer end of the link is yielding.

Preferably the chamber *a21* communicates through a pipe with a tank *a60* of air under exactly the pressure required for the particular work, to increase the effective volume of air under that pressure above that contained in chamber *a21*.

The electrodes, of which there are two pairs, start their forward movement at about 18° of rotation of the cam shaft, Fig. 23. Each pair consists of an upper member *b3* and a lower member *b4*, Fig. 18. Each pair of electrodes is pivotally mounted in a slide *b5*, Fig. 22, in guides on the frame of the machine. Each slide is reciprocated by a cam *b6* on the cam shaft B. The cam has a groove into which projects roller *b8*, connected through a rod *b9* to the slide *b5*. The forward movement of the electrode to the position shown in Fig. 18 is accomplished at about 46° rotation of the cam shaft, Fig. 23. The link engaging ends of the electrodes are held open against the tension of springs $b10$, $b10$ by the rollers, $b11$, $b11$, Fig. 18, until the ends are in position to engage the link. Then the rollers are separated by the rocking of the shafts $b12$, $b12$, which are geared together, and the separation of the arms $b13$, $b13$ carrying the rollers. The shaft $b12$ is rocked by the arm $b15$ provided with a roller $b14$ which is operated by cam $b16$ on the cam shaft. The electrodes are closed on the link at the end of about 60° rotation of the cam shaft.

The cam shaft B, Fig. 22, is operated by a reduction gearing 2, 3 from the counter shaft 4. The latter is driven through a clutch 5 from the motor 6.

After the cam shaft B has rotated about 60° the clutch 5 on the counter shaft is disengaged and the cam shaft is stopped by the application of a suitable brake not shown. The cam shaft remains stationary while the welding current passes through the link. After a length of time, predetermined by the setting of the tube timer, the current is cut off and the cam shaft B restarted by the closing of the clutch 5, as will be described in connection with the electrical devices embodied in the machine as illustrated in Figs. 24-26.

When the cam shaft restarts, the cam $b16$ operates the rollers $b11$ on the end of the arms $b13$ to press the rollers onto the rear ends of the electrodes, Fig. 18, and separate the forward ends of the electrodes from the link.

At about 75° of rotation of the cam shaft, the electrodes begin to be retracted by the cams $b6$, $b6$ which retract the slides $b5$, $b5$ in which the electrodes are pivotally mounted. The electrodes are fully retracted at about 105° of the rotation of the cam shaft.

The push-up is started at about 78° of the rotation of the cam shaft and may be completed at about 90°, Fig. 23.

Before the push-up, the mechanism by which the push-up is performed is in the position shown in Fig. 15. The rod $a25$ is held in a stationary position to the right. As pointed out in connection with Fig. 1, the rod is provided at its left-hand end with a piston $a22$ in the chamber $a21$ in the housing $a20$ provided with the toggle $a3$, $a4$, which is now straightened.

The rod $a25$, Fig. 15, has affixed to it a collar $a26$ which has ratchet teeth $a27$ on its left-hand side. This collar abuts against a cross-head $a28$ also affixed to the rod. At each end this cross-head is provided with bolts $a29$ having collars $a30$ affixed thereto at the left-hand ends. Bearing against each collar is a spring $a31$ surrounding the bolts, the right-hand end of which bears against a collar $a32$ loose on the bolt but affixed to the frame of the machine. The springs $a31$, being under tension, tend to force the cross-head and the rod $a25$ to the left, but there is loosely mounted on the rod a sleeve $a33$ having at its right-hand end a ratchet $a34$ with teeth which are complementary to the teeth $a27$ on the collar $a26$ on the rod $a25$. This sleeve, through a ball bearing $a35$, bears against an abutment $a36$ secured to the frame of the machine.

In the position shown in Fig. 15, the ends of the teeth on the ratchet $a27$ and on the rod bear against the tops of the teeth on the ratchet $a34$ on the sleeve $a33$ and thereby prevent the springs $a31$ from moving the rod $a25$ to the left.

At about 78° of the rotation of the cam shaft, the sleeve $a33$ is rotated sufficiently to move the teeth on the ratchet $a34$ beyond the ratchet teeth $a27$ on the collar $a26$ on the rod $a25$. This rotation is performed by a cam $a37$, Figs. 16 and 22, on the main cam shaft B, which operates a roller $a38$ on the end of one arm $a39$ of a bell crank lever pivoted at $a40$, Fig. 1. The other arm $a41$ of the bell crank lever is pivoted to a rod $a42$ which oscillates the lower end of an arm $a43$ loosely journaled on the sleeve $a33$. This arm carries a pawl $a44$, Fig. 17, which is adapted to engage a ratchet $a45$ fast to the sleeve $a33$. At the appropriate moment the sleeve $a33$ is slightly rotated to release the ratchet collar $a27$ on the rod $a25$, Fig. 15.

Near the left-hand end of the rod $a25$ there is a nut $a46$ threaded on the rod $a25$ so as to be adjustable thereon. The nut $a46$, when the rod $a25$ is forced by the springs $a31$ to the left, bears against the bushing $a47$ screwed into the housing $a20$. Thus, when the sleeve $a33$ is slightly rotated, as above described, the housing $a20$ is forced to the left and, by the springs $a31$ through the straightened toggle $a3$, $a4$, Fig. 1, presses the right-hand end of the link positively against the left-hand end. By adjusting the position of the nut $a46$, Fig. 15, on the rod $a25$ the distance of the push-up may be adjusted. The nut $a48$ is a lock nut. Screwed on the right-hand threaded end of the rod $a25$ is a nut $a52$ which can be adjusted so as to be a certain distance from a bearing $a54$ on the frame, thereby limiting the distance which the rod $a25$ can be moved to the left when the ratchet teeth $a27$ and $a34$ are disengaged. Nut $a53$ is a lock nut.

The push-up dwells from about 90° to 105° of the rotation of the main cam shaft B, Fig. 23. Then another cam $a50$ on shaft B, Fig. 16, independently operates another ratchet $a51$ fixed on sleeve $a33$ through similar operating mechanism which includes a cam roller $a55$, lever $a56$, connecting link $a57$, arm $a58$ and pawl $a49$, to turn the sleeve $a33$ slightly, Fig. 15, to cause the teeth on the ratchet $a34$ to ride against the inclines of the teeth $a27$ of the ratchet $a26$ on the rod $a25$ and thereby force the rod to the right and restore the parts to the position shown in Fig. 15. This completes the action of the push-up.

The mechanism for operating the burr cutter D begins to operate at about 96° of the rotation of the cam shaft, Fig. 23. The cutter has a compound movement to the right and downward and then a forward movement to bring it to the position shown in Fig. 4. It is then given a movement to right, Fig. 4, to trim off the burr on the top, the outside and the bottom of the link, Fig. 5.

As shown in Figs. 11 and 12, the cutter D is secured in the end of a lever $d2$ pivoted at $d3$ in a block $d4$ which is slidably mounted in a block $d5$ for right and left reciprocation. To the block $d4$ is secured a rack $d1$ which meshes with the pinion $d6$ splined on shaft $d7$ which is mounted in a bearing $d8$ on the frame of the machine. Fastened to the shaft $d7$, Figs. 11 and 13, is another pinion $d9$ which meshes with a segmental gear $d10$ fast on shaft $d11$, Figs. 13 and 14. On the shaft $d11$, Fig. 13, is fastened an arm $d12$, the upper end of which is pivoted to a link $d13$ pivoted at $d14$ to an arm $d15$ fast on the shaft $d16$.

To move the cutter to the right, the shaft $d16$ is rocked by cam $d17$ on the main shaft B, Fig. 22, into a groove in which cam projects a roller $d18$ on the end of another arm $d19$ fast on shaft $d16$. This rocks the segmental gear $d10$, the pinion $d9$ and the shaft $d7$, Fig. 12. The pinion $d6$ on shaft $d7$, Fig. 12, meshing with the rack $d1$, moves the block $d4$ and with it the cutter D a certain distance to the right.

At the same time the cutter D is moved downward as follows: The lever $d2$, carrying the cutter D, has at its left-hand end a roller $d20$ which projects into a cam groove $d21$ in a plate $d22$ which is mounted on and secured to block $d5$, Fig. 14. When the block $d4$, on which lever $d2$ is pivoted, is moved to the right, the roller $d20$ rides in the cam groove $d21$ and, being lifted thereby, it depresses the right-hand end of lever $d2$ to move the cutter D downward. This brings the notch in the cutter in the same horizontal plane as the chain link A which is in welding position.

The cutter then is moved forward so that its notch is in alignment with the link as shown in Fig. 4. To accomplish this, the block $d5$, on which the block $d4$ is slidably mounted, Fig. 12, has bearings $d23$ on the frame, Fig. 13, so as to be capable of sliding forward and rearward. To the rear end of the block $d5$, Fig. 14, is pivoted a rod $d24$, which is operated by cam $d25$ on the main shaft B. This cam operates a roller $d26$ on the end of an arm $d27$, pivoted at $d28$ on the frame, to move the rod $d24$ and the block $d5$ forward. As block $d4$ is mounted on block $d5$ and the cutter D is secured in the lever $d2$ pivoted on block $d4$, the forward movement of the block $d5$ carries the end of the cutter D forward into the position shown in Fig. 4.

To cause the cutter D to move to the right and trim the burr, the block $d4$ is given a further movement to the right by another rocking of the shaft $d16$ by the cam $d17$ on the cam shaft. This, through the connections $d15$, $d14$, $d13$, $d12$ and $d11$, moves the segmental gear $d10$, which turns the pinions $d9$ and $d6$ which latter moves the rack $d1$ fast on the block $d4$.

This movement to the right of the cutter D moves it along the welded link ends to trim off the burr on the outside, the top and the bottom of the weld. Fig. 5 shows the cutter in position with its notch embracing the link just before it trims off the burr. After the burr has been trimmed off on the outside, the top and bottom of the weld, the remaining portion of the burr is on the inside of the link as shown in Figs. 5 and 6.

The cutter D may have its cutting notch so cut out or may be so operated that it does not trim off the outside of the burr but only the top and the bottom. In fact it may be so constructed or operated as to trim off only either the top or the bottom. It is more important to trim off the top and bottom of the burr because it is those portions of the metal which are not so fully removed by the subsequent swaging and therefore cause undesirable "necking," while the metal of the burr on the outside may be substantially removed by the swaging.

The cutter, having performed its burr trimming operation, is then drawn to the left, moved rearwards and lifted and again moved further to the left to restore it to its original position, shown in Figs. 1 and 11, by a reversal of the operation of the mechanisms above described by their respective cams $d17$ and $d25$ on the cam shaft B.

The trimming off and removal of so much of the burr, amounting in itself to about 65%, is of the greatest importance because it enables the removal of an even larger percentage of the extruded metal which, in the form of dross would otherwise have been forced back into the good metal of the link and which would have had the effect of "necking." This "necking" in the operation of electric load chain welding as performed prior to our invention has materially weakened the link at the weld.

The swaging operation begins at about 180° of the rotation of the cam shaft, Fig. 23. There are four sets of swaging dies as indicated in Fig. 1. Each set is carried by a turret $e11$, $e12$, which is rotatably mounted on a block $e13$ slidably mounted on the frame $e14$ of the machine, Fig. 18. A cam $a8$ on the cam shaft B operates a roller $e15$ which extends into a groove in the cam. The roller is on the end of an arm $e16$ pivotally connected to the rod $e17$, Fig. 22. The rearward movement of the rod raises the lower slide $e13$ through the connections $e18$ and lowers the upper slide $e13$ through the connections $e19$. Both of these connections operate through springs $e30$, Fig. 18, thereby permitting precise control of the pressure. This brings the swaging dies, shown in Fig. 6, down onto the link and swages the metal and causes extrusion of the fins, as shown in Fig. 7.

The forward movement of the rod $e17$, Fig. 18, lowers the lower swaging slide $e13$ and lifts the upper swaging slide $e13$. In this movement, the turrets carrying the dies are rotated 90° by the mechanism shown in Figs. 19, 20 and 21. The shaft $e20$ of each turret has secured to it a ratchet $e21$ which is engaged by pawls $e22$ on a disc $e23$ having a pinion $e24$ loose on the shaft $e20$. In the rise of the turret (having reference now to the upper turret shown in Fig. 20) the pinion is given a quarter turn by engagement with the rack $e25$ on the frame of the machine. The pawls $e22$ on the disc $e23$, secured to the pinion, therefore turn the shaft and turret 90°. The index disc $e26$, secured to the shaft, is locked in position by the dog $e27$ pivoted on the slide and pressed by the spring $e28$. When the slide and turret rise, this dog is disengaged from the notch in the index disc by its end being depressed by contact with the stud $e29$ on the frame. As the slide and turret descend, this end of the dog descends below this stud $e29$ and the spring $e28$ causes the dog to engage with one of the notches on the index disc thereby locking the turret against rotational movement in its swaging operation. A duplicate of this mechanism turns and locks the lower swaging turret.

In the second swaging movement of the swaging turrets the dies shown in Fig. 8 operate upon the link. Each die has one lip longer than the other so as to bend and break off the fins shown in Fig. 7.

The next operation of the swaging turrets brings the set of dies shown in Fig. 9 against the link which further break off the fins and the fourth operation of the swaging turrets brings the dies shown in Fig. 10 into operation to complete the removal of the fins and the swaging of the link.

These swaging operations take from about 180° to about 324° of the rotation of the cam shaft, Fig. 23.

The nesting dies, which engage the outer ends of the link, are withdrawn beginning at about 321° of the rotation of the cam shaft. The same cam and mechanism which cause the straightening of the toggles, Fig. 1, operate to break these toggles and return the parts to the position shown in Fig. 1.

The chain carrying sheave f1, Figs. 2, 18 and 22, which has held the link in welding position, is caused to begin to advance to bring another chain link into welding position at about 336° of the rotation of the cam shift. A cam a7 on the cam shaft B has a groove into which extends a roller f2 on a lever f3 pivoted at its top to a stud f4 on the frame and at its lower end to the rod f5 extending to the front of the machine, Fig. 18. This rod has an arm loose on shaft f6 and carrying a pawl f7 which engages with a ratchet f8 secured to said shaft. The shaft has a beveled pinion f9 which meshes with the bevel gear f10 on the vertical shaft f11, which, through a universal link f12, turns the vertical shaft f13. This vertical shaft through a chain of gears rotates the vertical shaft f14, to the upper end of which is secured the sheave f1 which engages the chain, Figs. 2 and 22. The operation of the cam a7 on the cam shaft B advances the sheave an amount equal to the interval between one link and the next alternate successive link which lies in the same plane.

To facilitate the movement of the chain, the sheaves f15 over which the chain moves, Fig. 22, are caused to advance an equal amount by the mechanism shown in Fig. 18. The vertical shaft f13 has a beveled pinion f16 which engages with a beveled gear f17 on a shaft f18 which through idle pinion f19 and pinion f20 fast on shaft f21 turns one of the sheaves carrying the chain. A similar gearing operates the other sheave f15 but in the opposite direction. In mounting the chain on the sheaves, which may be frictionally adjustable, a definite slack should be present on the feed-in side of the chain carrying sheave f1 and the sheave f15, sufficient to allow for proper weld take up.

When the chain carrying sheave has brought the fresh link to welding position it is held in that position by a detent f22, Fig. 18, which engages the ratchet f8 on the shaft f6. The cam a7 on the cam shaft returns the rod f5 with its arm and pawl f7 to its original position, shown in Fig. 18.

The electrical devices, which stop the cam shaft B at about 60° of its rotation and initiate and stop the flow of the welding current after a predetermined length of time and restart the cam shaft, will now be described.

The main cam shaft B, Fig. 24, carries two cams g2 and g3 which operate switches g4 and g5. As indicated in Figs. 25 and 26, the switch g4 and its cam g2 are so arranged that the switch g4 is normally open at the beginning of the cam shaft cycle and closes after the first 60° of that cycle while the switch g5 is normally closed and opens after the first 60° revolution of the main cam shaft.

These switches are electrically connected with a tube timer g6 and with a solenoid g7 operating the clutch 5 as follows:

Assuming the main cam shaft is at 0° with an unwelded link A in welding position, the power switch g8 in the main line is closed. This starts the motor 6. The clutch shaft 4 (6 to 1 ratio to cam shaft) is then started by pushing the start button g9 which energizes relay g10 closing contact g11 in the clutch solenoid circuit starting the clutch shaft and driving the main cam shaft. Energizing relay g10 also closes a contact g12 which closes a circuit through switch g5 thereby locking in the relay g10 so that relay g10 remains energized after the start button g9 is released.

When the cam shaft B has advanced 60° in its revolution, the switch g5 opens, thereby de-energizing the relay g10 and the clutch solenoid g7 and closing the contact g13. At this point switch g4 has closed, and consequently the relay g20 is energized through switch g4 and closed contact g13.

The relay g20 starts the tube timer g6 through the contact g21. The tube timer operates electronic switch g22, in the well known manner, to close the circuit through the primary g23 of the welding transformer, thereby creating the welding current through the secondary g24.

After a predetermined time, usually only a very few seconds, the tube timer operates to de-energize the control circuit of the electronic switch, which cuts off the current through the primary g23 of the transformer and stops the welding current.

In order to restart the clutch shaft 4 after the welding current stops, the tube timer energizes the relay g30 to close the contact g31. The relay g40 is thereby energized to close contact g41 which locks in the relay g40 through closed switch g4. The relay g40 also closes a contact g42 which is in series with a normally closed contact g32, whereby relay g50 is energized to close contact g51. The current thereby flows through relay g10. This will open normally closed contact g13 to de-energize the relay g20 and consequently the tube timer g6. Also, relay g10 closes contact g11 to operate the solenoid g7 to engage the clutch to restart the cam shaft B. In addition, relay g10 by closing contact g12 locks itself in through switch g5 which is closed as soon as the cam shaft B starts. The rotation of the cam shaft also opens switch g4 thereby de-energizing relay g40 to open contact g42 and de-energize relay g50.

After the main cam shaft passes the 0° position, the above described cycle of operations will be repeated (upon another link) without requiring further operation of the start button.

In order to stop the cam shaft B without stopping the motor, a stop button g60 is interposed in the power line. This stop button, when pressed, opens the line. It de-energizes relay g10, thereby de-energizing the clutch solenoid g7. The clutch is of the well known pin type and therefore does not become disengaged until the end of a clutch shaft revolution. Pressing the stop button g60 also de-energizes relays g20, g40 and g50 even if switch g4 is closed.

If the stop button g60 is pressed during the first 60° of the cam shaft revolution, the switch g4 will be closed and the switch g5 will be opened when the cam shaft has rotated to the 60° position and therefore, if the stop button has been released, the relays and all the devices operated thereby will be operated to make the weld as above described and the machine will continue to run.

However, if the stop button is pushed at any point in the cycle except during the first 60° of the cam shaft rotation, the clutch shaft will complete its revolution (i. e., to 120°, 180°, 240°, 300° or 360° in the rotation of the cam shaft) and stop, thereby stopping the machine. The machine can again be started only by pushing the start button g9 as above described. When the start button g9 is pushed when switch g5 is open (i. e., at 60° in the cycle), the button must be held down until the switch g5 closes.

We claim:

1. Apparatus for welding the links of a load chain comprising nesting dies for applying pressure to a link to bring the open ends of the link into firm engagement, a spring for applying additional pressure to said dies at a predetermined point in the cycle of said apparatus, a trip device for taking the thrust of said spring during other portions of the cycle of said apparatus, and power transmitting connections for cyclically operating said trip device to load and trip said spring.

2. Apparatus for automatically welding the links of a load chain comprising nesting dies for holding a link in welding position, pairs of electrodes for gripping said link ends, air cushioned means for moving said nesting dies together to apply an initial pressure on said link, thereby bringing said link ends into firm engagement, a loadable spring, a trip device for loading said spring, connections between said spring and one of said nesting dies operable upon actuation of said trip device to apply additional pressure to said nesting dies and power transmission means for cyclically operating said trip device to load and trip said spring.

3. In apparatus for welding the links of a load chain having swaging dies reciprocable towards and away from a link positioned in welding position along paths directionally transverse to the axis of said positioned link, a cutter mounted for movement through a path substantially transverse to said swaging die paths for severing portions of a burr formed on said link, and means for cyclically operating said cutter along said path.

4. In apparatus for welding the links of a load chain having swaging dies reciprocable in a vertical plane towards and away from a link positioned in welding position, a cutter mounted for movement through a horizontal path for severing portions of a burr formed on said link, and means for cyclically operating said cutter along said path.

5. In a machine for the electric welding of chain links each made of a single piece of metal and bent to form an open link with its ends opposite to and in proximity to one another, said machine having nesting dies for holding the link in welding position, pairs of electrodes for engaging the link close to its ends and for passing a welding current across said ends, and reciprocating swaging dies to swage the link, the combination of means to press said nesting dies toward one another in two stages comprising air cushioned devices to press the ends of the link into contact before the inception of the welding current as the first stage and devices to apply additional pressure to press the ends of the link together to form the weld as the second stage, said last named devices including a spring pressed member, a detent to hold said member from movement, means to trip the detent and means to limit positively the extent of the push-up movement of said member, whereby the weld is made and a burr of heated soft metal is extruded around the weld, and means to cut off parts of said burr, said means comprising a cutter and operating devices, actuated before the reciprocation of the swaging dies, to move the cutter in a plane parallel to the plane of the link to cut off heated soft metal of the burr while the link is held in welding position.

6. In a machine for the electric welding of chain links each made of a single piece of metal and bent to form an open link with its ends opposite to and in proximity to one another, said machine having nesting dies for holding the link in welding position, pairs of electrodes for engaging the link close to its ends and for passing a welding current across said ends and reciprocating swaging dies to swage the link, in combination therewith means to press said nesting dies toward one another to form a weld between the ends of said link with an extruded burr, a cutter adapted to cut off parts of said burr and operating devices, actuated before the reciprocation of the swaging dies, to move the cutter in a plane parallel to the plane of the link to cut off heated soft metal of the burr while the link is held in welding position.

7. In a machine for the electric welding of chain links each made of a single piece of metal and bent to form an open link with its ends opposite to and in proximity to one another, said machine having nesting dies for holding the link in welding position, pairs of electrodes for engaging the link close to its ends and for passing a welding current across said ends, and reciprocating swaging dies to swage the link, the combination of means to press said nesting dies toward one another to increase the pressure exerted by said dies on a link held thereby and extrude softened metal of a held link into a burr, a cutter, and operating devices adapted to be actuated before the reciprocation of the swaging dies, to move the cutter to cut off a portion of the burr of the held link.

8. Apparatus as claimed in claim 7, in which the cutter is mounted for movement through a cutting path substantially transverse to the paths of reciprocation of the swaging dies.

9. Apparatus as claimed in claim 7, in which the cutter is mounted for movement along a cutting path disposed parallel to the major axis of the held link.

10. Apparatus as claimed in claim 7, in which the cutter is of semi-circular contour and of a size corresponding substantially to the gauge of the link through a predetermined arc, and in which said cutter is mounted for movement along a cutting path disposed parallel to the major axis of the held link.

11. Apparatus as claimed in claim 7, in which the pressure increasing means includes a loadable spring, a trip device for taking the thrust of said spring when loaded, and power transmission means for cyclically loading and tripping said spring.

12. Apparatus as claimed in claim 7, in which the pressure increasing means includes a loadable spring, a trip device for taking the thrust of said spring when loaded, power transmission means for cyclically loading and tripping said spring and a mechanical stop for positively limiting the relative movement of said nesting dies in response to the thrust of said spring when said device is tripped.

13. In a machine for the electric welding of chain links each made of a single piece of metal and bent to form an open link with its ends opposite to and in proximity to one another, said machine having nesting dies for holding the link in welding position, pairs of electrodes for engaging the link close to its ends and for passing a welding current across said ends and reciprocating swaging dies to swage the link, in combination therewith means to press said nesting dies toward one another in two stages comprising air cushioned devices to press the ends of the link into contact before the inception of the welding current as the first stage and devices to apply additional pressure to press the ends of the link together to form the weld as the second stage, said last named devices including a spring pressed member, a detent to hold said member from movement, means to trip the detent and means to limit positively the extent of the pushup movement of said member.

14. In electric welding apparatus, opposed devices for holding the work to be welded in welding position, means for moving said devices together to apply an initial low pressure on said work, resilient means for increasing the pressure applied to said work by said devices, a detent to hold said means from movement and power transmission means for tripping said detent to apply the pressure of said resilient means to said devices.

15. Apparatus as claimed in claim 14, in which the means for moving said devices to apply the initial low pressure includes an air cushion.

16. Apparatus as claimed in claim 14, in which the means for moving said devices to apply initial low pressure includes an air cushion, and in which rigid connections are interposed between the resilient means and one of said opposed devices for transmitting to said devices the high pressure applied by said resilient means upon tripping the detent.

17. Apparatus as claimed in claim 14, in which the movement of said devices in response to the high pressure applied by said resilient means is positively limited by a mechanical stop.

18. In apparatus for welding chain links, opposed nesting dies movable towards and away from one another to hold a link of a chain, a cutter mounted for movement in a path parallel to the plane of a link held by said dies for severing a burr formed adjacent a weld in said link and power transmission means for moving said cutter along said path while said dies hold said link.

19. Apparatus as claimed in claim 18, in which the cutter is substantially semi-circular in contour and of a size substantially coinciding with the gauge of the link throughout a predetermined arc.

FRANCIS H. SPEED.
JOHN S. PIKE.